United States Patent [19]
Eitan et al.

[11] Patent Number: 5,834,859
[45] Date of Patent: Nov. 10, 1998

[54] BATTERY BACKED CONFIGURABLE OUTPUT BUFFER

[75] Inventors: Boaz Eitan, Ra'anana, Israel; Chang Hee Hong, Fremont, Calif.

[73] Assignee: Waferscale Integration, Inc., Fremont, Calif.

[21] Appl. No.: 749,617

[22] Filed: Nov. 18, 1996

[51] Int. Cl.$^6$ ........................................... H03K 19/017
[52] U.S. Cl. ..................... 307/66; 307/64; 395/750; 365/229; 326/58; 326/85; 326/87; 326/91
[58] Field of Search ............... 307/66, 64; 365/229; 326/85, 87, 91, 58; 327/404; 395/750

[56] References Cited

U.S. PATENT DOCUMENTS

| | | | |
|---|---|---|---|
| 4,654,829 | 3/1987 | Jiang et al. | 365/229 |
| 4,730,121 | 3/1988 | Lee et al. | |
| 4,877,978 | 10/1989 | Platt | 326/58 |
| 4,880,997 | 11/1989 | Steele | 326/58 |
| 4,908,790 | 3/1990 | Little et al. | |
| 4,963,766 | 10/1990 | Lundberg | 326/58 |
| 5,237,699 | 8/1993 | Little et al. | 395/750 |
| 5,315,549 | 5/1994 | Scherpenberg et al. | |
| 5,557,229 | 9/1996 | Eitan | |

*Primary Examiner*—Jeffrey A. Gaffin
*Assistant Examiner*—Albert W. Paladini
*Attorney, Agent, or Firm*—Skjerven, Morrill, MacPherson, Franklin & Friel

[57] ABSTRACT

The present invention is a battery backed output buffer which provides a well-defined signal, even during battery power. The buffer includes a regular output buffer for providing output data during operation with a main power supply and for switching to a tri-state during battery power. The buffer also includes a configurable battery backed output buffer which provides a predetermined output signal during battery operation and produces a signal in the tri-stated during main power operation.

11 Claims, 5 Drawing Sheets

BATTERY BACKED CONFIGURABLE OUTPUT BUFFER

FIELD OF THE INVENTION

The present invention relates to output buffers generally and to such output buffers which operate on a battery switched supply signal in particular.

BACKGROUND OF THE INVENTION

Programmable system devices (PSDs), such as those produced by Waferscale Integration Inc., the assignee of the present invention, combine volatile random access memory (RAM) arrays, also known as "static RAMs" or SRAMs, programmable logic devices (PLDs), electrically programmable read only memory (EPROM) arrays and logic blocks on a single chip.

SRAMs require a power supply to maintain the information stored therein. Typically, the power supply is the main supply for the entire VLSI circuit. However, if the VLSI circuit is of the type which occasionally is shut off, the information stored in the SRAM array will be lost.

Those circuits which utilize SRAM arrays but require that the information be maintained have battery backup power supplies which are activated when the main power supply has failed or is powered down. The battery backup power supply voltage level is typically the lowest voltage level necessary to maintain the information and is typically significantly less than the main supply voltage level.

To utilize a backup power supply, a switching circuit is necessary which continually compares the voltage levels of the two supplies and switches to the backup power supply when the voltage level of the main supply falls below that of the backup power supply. The output of the switching circuit is a switched power supply signal.

Output buffers provide output signals to output pins which, in turn, provide the signal to the external world. When the main power supply is shut off, no action occurs and in the prior art, the signal provided by the output pin during standby power is of no interest. Therefore, in the prior art, the output buffer is not powered and the output pin provides a floating or undefined signal.

SUMMARY OF THE PRESENT INVENTION

The present invention is a battery backed, configurable output buffer which provides a well-defined signal, even during battery power. The buffer includes a regular output buffer for providing output data during operation with a main power supply and for switching to a tri-state during battery power. The buffer also includes a configurable battery backed output buffer which operates at least during battery operation to provide a predetermined output signal.

In accordance with a preferred embodiment of the present invention, the configurable battery backed output buffer includes an output unit and a configuration unit. The output unit, which is powered by the battery power supply, produces a predefined output signal during battery backed operation and produces a signal in the tri-state during main power operation. The configuration unit activates or deactivates the output unit in accordance with a predetermined configuration signal.

Moreover, in accordance with a preferred embodiment of the present invention, the configuration unit includes a p-channel transistor and an n-channel transistor. The p-channel transistor is connected between the battery power supply and the output unit and is activated by the predetermined configuration signal. The n-channel transistor is connected between the output unit and a ground source and is activated by a complement of the predetermined configuration signal. The configuration unit enables the output unit only when so indicated by the configuration signal.

Additionally, in accordance with a preferred embodiment of the present invention, the configurable output buffer includes a second p-channel transistor and a second n-channel transistor which are controlled by a battery off and a battery on signal, respectively. The battery off and on signals enable the output unit only when the battery is on.

Further, in accordance with a preferred embodiment of the present invention, the configurable output buffer includes a diode connected between the battery supply and the configuration unit.

There is also provided, in accordance with a preferred embodiment of the present invention, a battery switchable output buffer which includes an output line, a pull-up branch, a pull-down branch and a battery operation unit. The pull-up branch receives data to be provided out and pulls the voltage of the output line up if the data has a high voltage level. The pull-down branch receives data to be provided out and pulls the voltage of the output line down if the data has a low voltage level. The battery operation unit forces both of the branches to an off position during battery operation thereby to provide an output signal in the tri-state.

There is further provided, in accordance with a preferred embodiment of the present invention, a battery switchable output buffer which includes the output line, the pull-up branch, the pull-down branch, a p-channel pull-up transistor connected on output to the output line, an n-channel pull-down transistor connected on input to the output line and a battery operation unit. The pull-up branch activates a gate of the pull-up transistor if the data has a high voltage level and the pull-down branch activates a gate of the pull-down transistor if the data has a low voltage level. The battery operation unit is controlled by a battery on signal which is high when the battery is on and deactivates both of the branches during operation of a battery thereby to deactivate both of the transistors and to provide an output signal in the tri-state on the output line.

Further, in accordance with a preferred embodiment of the present invention, the battery operation unit includes a pull-up branch deactivator and a pull-down branch deactivator. The pull-up branch deactivator includes an n-channel pass transistor, a p-channel pass transistor and a second p-channel pull-up transistor. The p-channel pass transistor is controlled by the battery on signal and its output is connected to the gate of the first p-channel pull-up transistor. The n-channel pass transistor is connected in parallel to the p-channel pass transistor and is controlled by the complement of the battery on signal. The second p-channel pull-up transistor is controlled by the complement of the battery on signal and its output is also connected to the gate of the p-channel pull-up transistor. When the battery on signal is high, the pass transistors are deactivated and the second p-channel pull-up transistor is activated to raise the voltage level of the gate of the first p-channel pull-up transistor thereby to deactivate the first p-channel pull-up transistor.

The pull-down branch has a pull-up portion and a pull-down portion and the pull-down branch deactivator includes a second p-channel pass transistor and a second n-channel pull-down transistor. The second p-channel pass transistor is connected in series between a voltage source and the pull-up portion and is controlled by the battery on signal. The second n-channel pull-down transistor is connected on input to the gate of the first n-channel pull-down transistor and is controlled by the battery on signal. When the battery on signal is high, the second p-channel pass transistor is deactivated and the second n-channel pull-down transistor is activated, thereby to lower the voltage level of the gate of the first n-channel pull-down transistor thereby to deactivate the first n-channel pull-down transistor.

Finally, in accordance with a preferred embodiment of the present invention, the n-wells of the p-channel transistors are powered by a switchable power supply providing a main power supply voltage level when said main power supply is active and a battery supply voltage level when said battery supply voltage is active.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Figure 1:
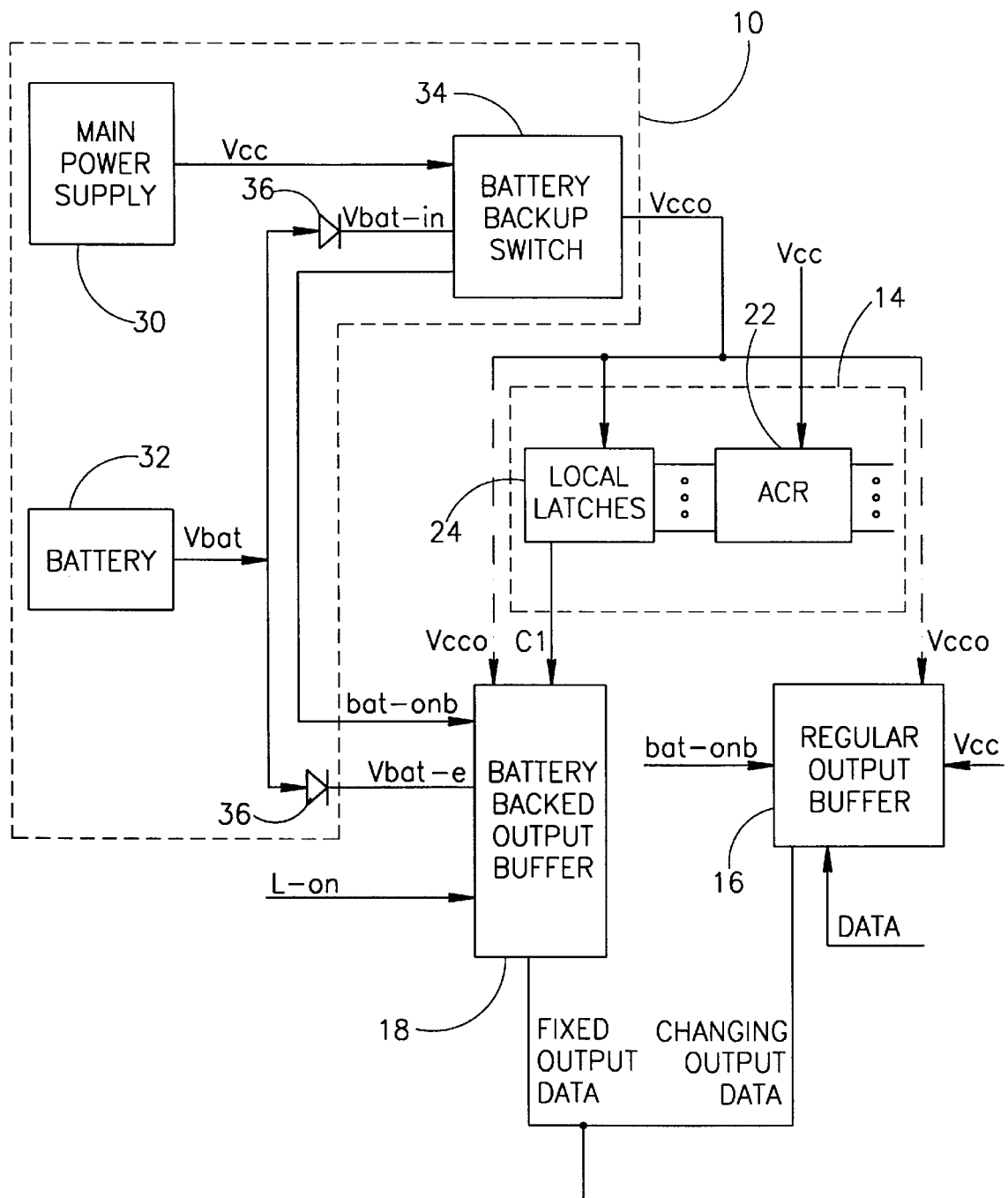
FIG. 1 is a block diagram illustration of the battery backed, configurable output buffer of the present invention.

Reference is now made to FIG. 1 which illustrates, in block diagram format, the battery backed, configurable output buffer, constructed and operative in accordance with a preferred embodiment of the present invention. The output buffer of the present invention and its various elements can form part of SRAMs, PSDs and other configurable devices.

FIG. 1 shows a switched power supply 10, a configuration unit 14 and two output buffers 16 and 18. The switched power supply 10 provides a switched power supply signal Vcco to at least some of the other units and a bat-onb signal, active when the battery is off, to the two output buffers 16 and 18. The configuration unit 14 continually provides configuration information to the various elements of the device of which the unit of FIG. 1 forms a part. FIG. 1 indicates that the configuration unit 14 provides a configuration bit C1 to buffer 18. A suitable configuration unit 14 which provides configuration information during battery operation is described in the U.S. patent application Ser. No. 08/749,615 entitled "A Unit for Maintaining Information Regarding the State of a Device During Battery Power" filed Nov. 18, 1996 and assigned to the common assignees of the present invention. The disclosure of that application is incorporated herein by reference.

Output buffer 16 is a standard output buffer 16 operative during main power and capable of providing variable output data and output buffer 18 is a battery backed output buffer 18 capable of providing a steady, well-defined output signal at least during battery power.

The switched power supply 10 comprises a main power supply 30 supplying a main supply Vcc, a battery 32 supplying battery supply Vbat and a battery backup switch 34 which switches between the main supply Vcc and the battery supply Vbat, always selecting the supply with the highest voltage level. Switch 34 can be any suitable switch such as are known in the prior art. For example, switch 34 can be the one described in U.S. Pat. No. 4,908,790 to Little et al. or the one described in the U.S. patent application Ser. No. 08/749,616 entitled "Battery Backup Switch" and filed Nov. 18, 1996 which is assigned to the common assignee of the present invention, both of whose descriptions are incorporated herein by reference.

In accordance with a preferred embodiment of the present invention, the battery supply Vbat is provided separately to the battery backup switch 34, as Vbat_in and to the battery backed output buffer 18, as Vbat_e. Each of the two supplies Vbat_in and Vbat_e are isolated from the battery 32 by diodes 36 which ensure that any short circuit, particularly one caused externally through an output pin, does not propagate back to the battery 32 and use up its charge.

Figure 2:
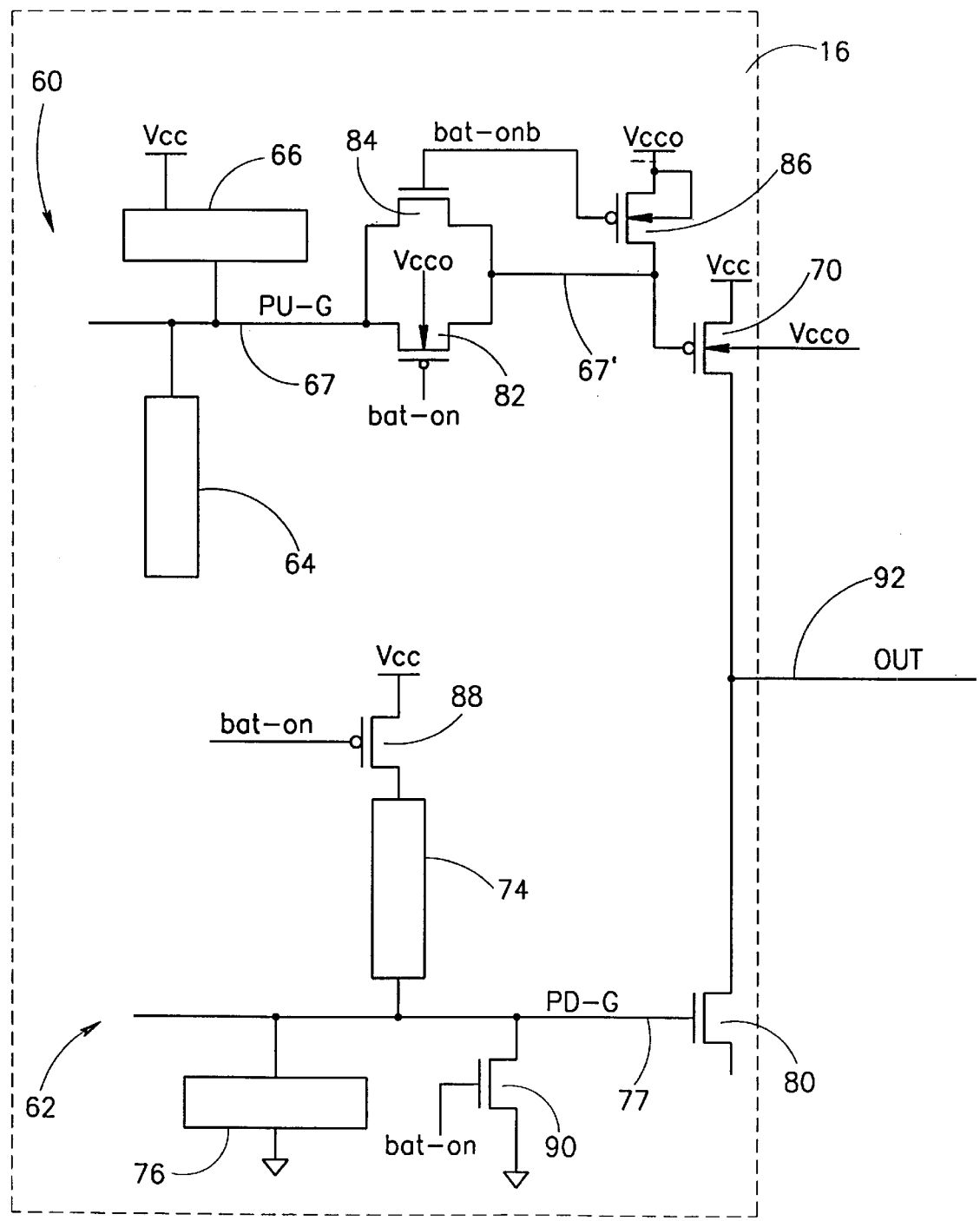
FIG. 2 is a partially schematic circuit diagram detailing the output buffer of the present invention.
Figure 3A:
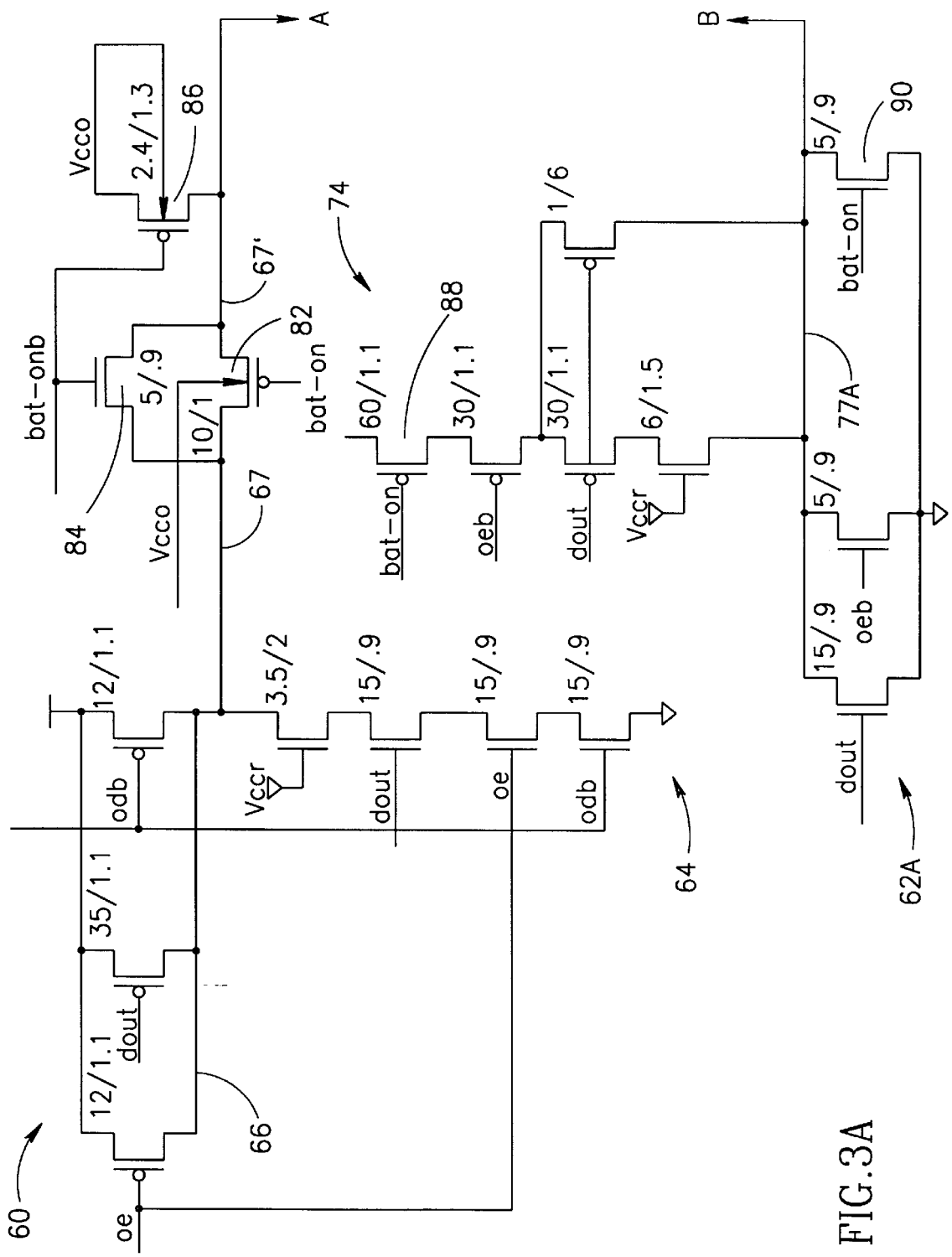
FIGS. 3A and 3B form a detailed circuit diagram of the circuit of FIG. 1.
Figure 3B:
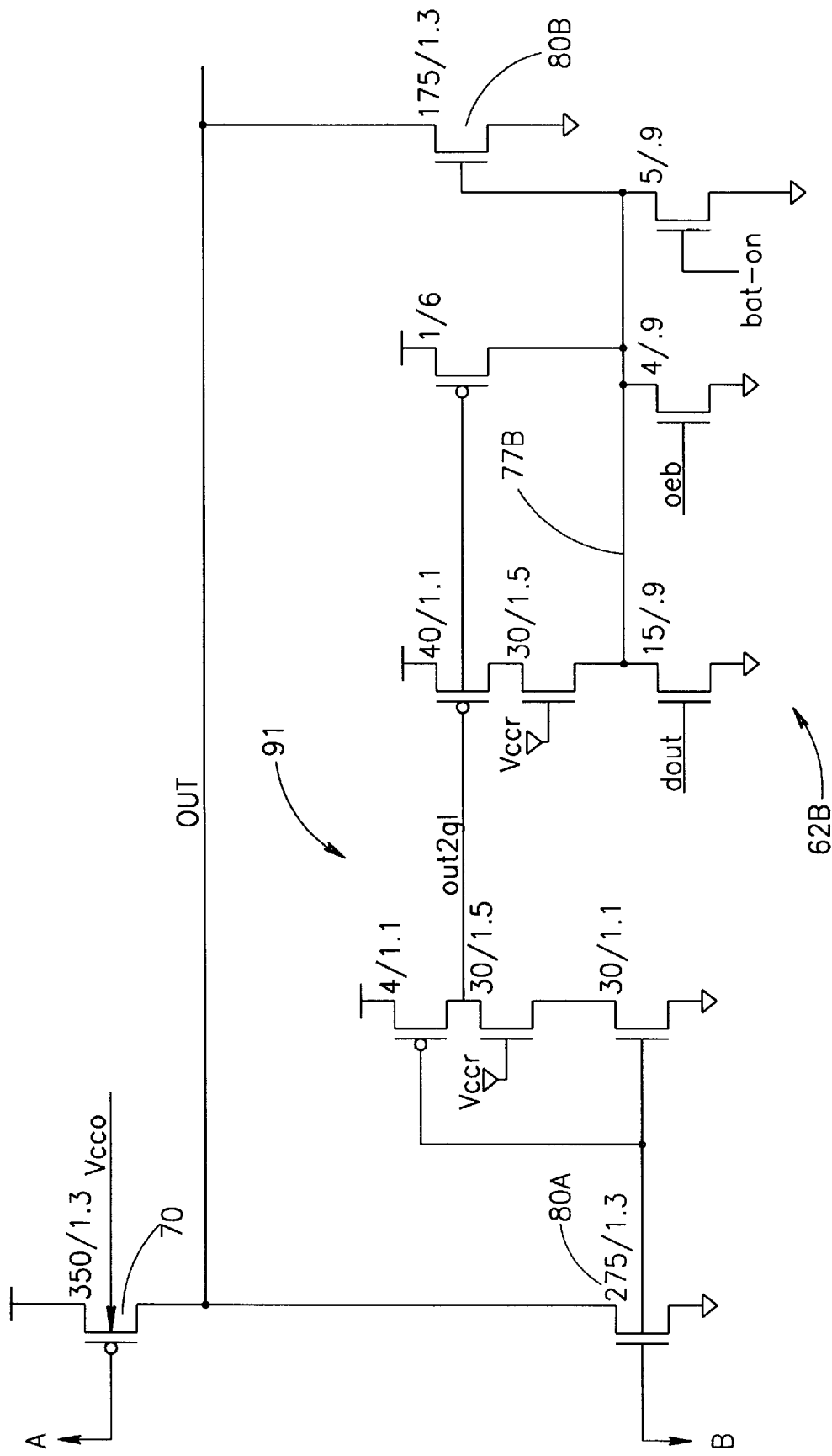

Output buffer 16 is any output buffer which provides data to the external world through an output pin and which can be in the tri-state during battery operation. An exemplary output buffer, described hereinbelow with respect to FIGS. 2, 3A and 3B, is based on the one described in U.S. Pat. No. 5,557,229, assigned to the common assignees of the present invention and incorporated herein by reference. Output buffer 18 is a configurable battery backed output buffer providing a well-defined signal during battery power and is described hereinbelow with respect to FIG. 4. In the most general embodiment, battery backed output buffer 18 is in the tri-state during regular operation.

For example, regular output buffer 16 produces an output signal from its input data signal during operation with the main power supply Vcc while, during battery operation, battery backed output buffer 18 provides the output signal from its logic input signal L-on. It is noted that the data signal typically changes considerably over time while the logic input signal L-on remains fixed during battery operation. As mentioned hereinabove, one buffer is tri-stated (i.e. in a state where it draws no current and thus, does not drive the output line) while the other buffer is operating.

It will be appreciated that the configurable output buffer of the present invention can form the output buffer for any suitable data source, such as a programmable logic device (PLD). In that embodiment, the PLD provides both the logic signal L-on and the data signal.

As can be seen, regular output buffer 16 is powered by the main power supply Vcc and battery backed output buffer 18 is powered by the battery power supply Vbat-e. Both buffers also received the switched power supply Vcco.

Figure 4:
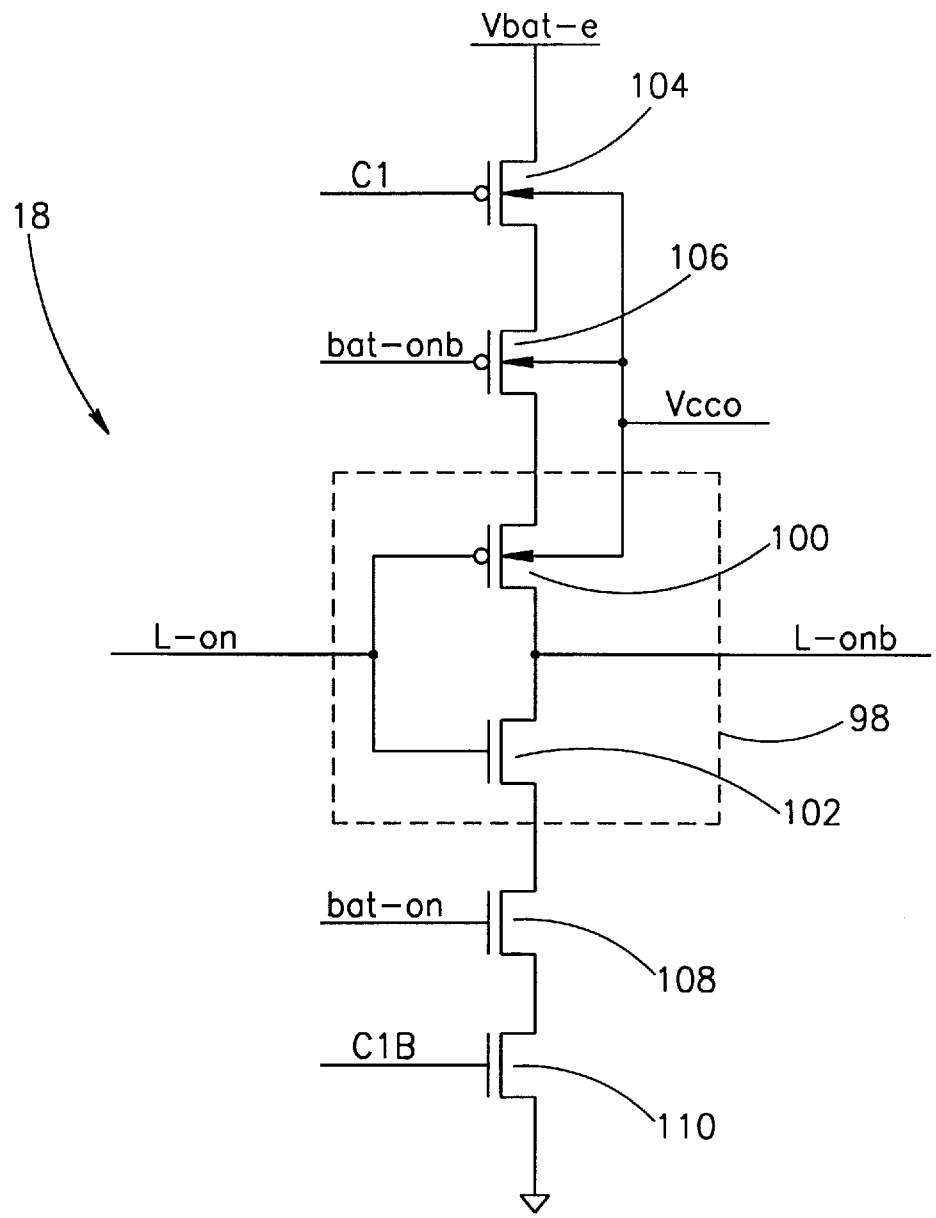
FIG. 4 is a detailed circuit diagram of a battery backed output buffer, constructed and operative in accordance with a preferred embodiment of the present invention.

Reference is now made to FIG. 2 which schematically illustrates output buffer 16, to FIGS. 3A and 3B which, together, detail the regular output buffer 16, and to FIG. 4 which details the battery backed output buffer 18.

The Regular Output Buffer

Referring to FIG. 2, regular output buffer 16 comprises two branches 60 and 62. As described in U.S. Pat. No. 5,557,229, branch 60 comprises a series 64 of concatenated n-channel pull-down transistors, a series 66 of p-channel pull-up transistors connected in parallel to a line 67 and a p-channel output pull-up transistor 70. Branch 62 comprises a series 74 of concatenated mostly p-channel pull-up transistors, a series 76 of n-channel pull-down transistors connected in parallel to a line 77 and an n-channel output pull-down transistor 80. Output transistors 70 and 80 are both connected to output line 92.

As will be described hereinbelow, during operation with the main power supply Vcc, the two branches 60 and 62 respond in opposite directions to control signals. When the data signal (not shown in FIG. 2) indicates a "1" value, the p-channel output pull-up transistor 70 of branch 60 pulls the output signal OUT up to the main power supply Vcc. When the data signal indicates a "0" value, the n-channel output pull-down transistor 80 of branch 62 pulls the output signal OUT signal down to the ground supply.

In accordance with a preferred embodiment of the present invention, the regular output buffer 16 includes a pull-up branch deactivator and a pull-down branch deactivator 80 as to be in a tri-state when the battery power supply Vbat is operating. For branch 60, the pull-up branch deactivator includes two pass transistors 82 and 84 and a battery on, p-channel pull-up transistor 86. For branch 62, the pull-down branch deactivator includes a switch transistor 88 and a battery-on, pull-down transistor 90.

Pass transistor 82 is a p-channel transistor which ends line 67 and is controlled by the complement bat-on signal (which is active when the battery is on). The output of pass transistor 82 is line 67' which controls pull-up transistor 70. Pass transistor 84 is an n-channel transistor controlled by the bat-onb of the bat-on signal and is connected in parallel to pass transistor 82. Battery on, pull-up transistor 86 is controlled by the bat-onb signal and is connected to line 67', pulling it up to the switched power supply Vcco.

During operation with the main power supply Vcc, the bat-on signal is low and, therefore, pass transistors 82 and 84 are both on and the signal on line 67 is passed to line 67'. At the same time, p-channel pull-up transistor 86 is off (since bat-onb is high) and, therefore, does not affect line 67'. As a result, the control signal to pull-up transistor 70 is the signal on line 67, as it should be.

During battery operation, the bat-on signal is high and, therefore, pass transistors 82 and 84 are both off, causing the signal on line 67 not to be passed to line 67'. Furthermore, battery on, p-channel pull-up transistor 86 is on (since bat-onb is low) and, therefore, pulls up line 67' towards the battery voltage of Vcco. Line 67 is, therefore, at a high value which will cause p-channel pull-up transistor 70 to be off.

As is known in the art, the n-wells of p-channel transistors must always be powered with the highest available power. As can be seen, the n-wells of all of p-channel transistors 82, 86 and 70 are fed by the switched power supply Vcco. Alternatively, the p-channel transistors can be forward biased.

Switch transistor 88 of branch 60 is a p-channel transistor connected between the power supply and series 74 of transistors. Battery-on, pull-down transistor 90 is an n-channel transistor connected to line 77. Both transistors 88 and 90 are controlled by the bat-on signal. Thus, during operation with the main power Vcc when the bat-on signal is low, p-channel transistor 88 is on and power flows to series 74 of transistors which then function as in the prior art. N-channel transistor 90 is off and thus, does not affect the signal on line 77.

During battery operation, though, p-channel transistor 88 is turned off, blocking the flow of power to series 74. N-channel transistor 90 is on and pulls down line 77. Accordingly, line 77 turns pull-down transistor 80 off.

It will be appreciated that, due to the additional elements described hereinabove, both pull-up transistor 70 and pull-down transistor 80, which control the output signal, are off during battery operation. Therefore, the output signal will be in the tri-state and buffer 16 will, in effect, not produce an output signal.

FIGS. 3A and 3B detail the elements of one exemplary embodiment of output buffer 16 in which the n-channel branch 62 is divided into two halves, 62A and 62B. The second half 62B includes delay elements 91 which delay its output by a predefined length of time. Thus, branch 62 responds in two steps. The remainder of FIGS. 3A and 3B is believed to be self-explanatory given the above description and the following explanation of the input signals: oe is the output enable signal, dout is the data signal, od is a logic signal and vccr is a voltage signal which, similar to the RECLRB signal, follows the main supply Vcc until it plateaus at a threshold level. The vccr signal plateaus at a high threshold level, such as 4.6 V.

The Battery Backed Output Buffer

FIG. 4 details the elements of an exemplary battery backed output buffer 18 which produces a battery on/off indication if configuration bit C1 has a zero value and is tri-stated otherwise.

Battery backed output buffer 18 comprises an inverter 98 formed of a p-channel transistor 100 and an n-channel transistor 102, two p-channel control transistors 104 and 106 connected in series between the battery power supply Vbat-e and p-channel transistor 100 and two n-channel control transistors 108 and 110 connected between n-channel transistor 102 and ground.

Control transistors 104, 106, 108 and 110 control the actions of inverter 98, enabling it only when so indicated by the configuration bit C1 and if the battery power supply 32 is being utilized. It will be appreciated that the voltage level of configuration bit C1 must be maintained during battery operation and that the power supply which is provided to battery output buffer 18 is Vbat-e.

When selected to do so, inverter 98 receives an input signal, such as the L-on logic signal, and inverts its value, thereby creating the output signal L-onb. It will be appreciated that the output signal L-onb has a fixed value, since, during battery power, none of the circuits which would change its value are operative.

Control transistors 104 and 110 are respectively controlled by the configuration bit signal C1 and its complement signal C1B. Control transistors 106 and 108 are respectively controlled by the bat-onb signal, received from the battery backup switch 34 and its complement signal bat-on. The bat-on signal is high when the battery power supply 32 is active.

The configuration bit signal C1 determines if the battery backed output buffer 18 is to perform at all. A high value for configuration bit C1 indicates that output buffer 18 is not to be enabled. The high value for the C1 signal deactivates p-channel control transistor 104 and its complementary low value for the C1B signal deactivates the n-channel control transistor 110. Conversely, a low value for configuration bit C1 enables output buffer 18.

Control transistors 106 and 108 are activated only once battery power is being utilized. During main power operation, the bat-on signal is low (and the bat-onb signal is high) which respectively deactivates n-channel transistor 108 and p-channel transistor 106. The result is that no power is transferred to inverter 98, regardless of the value of configuration bit signal C1. Accordingly, inverter 98 is tri-stated.

During battery operation, the bat-on and bat-onb signals activate control transistors 108 and 106. If, additionally, the configuration bit signals C1 and C1B activate control transistors 104 and 110, respectively, inverter 98 receives power and provides the output signal L-onb. If, however, the configuration bit signals C1 and C1B have disabled control transistors 104 and 110, respectively, inverter 98 receives no power and thus, output buffer 18 is tri-stated.

It is noted that the n-wells of the p-channel transistors 100, 104 and 106 are powered by the switched power supply Vcco which provides them with the highest available power. Alternatively, the p-channel transistors 100, 104 and 106 can be forward biased.

It will be appreciated that the battery backed output buffer 18 can have other forms as well. For example, if a dedicated battery backed buffer is desired, control transistors 106 and 108 are not included. Thus, buffer 18 is either configured always on or always off. Typically, in this embodiment, there is no need for regular output buffer 16 and buffer 18 receives the bat-onb signal as input, providing a battery on/off indication signal at all times.

Alternatively, if only the pull-up portion, formed of p-channel transistors 104, 106 and 100, is present, buffer 18 provides a chip enable signal.

It will be appreciated by persons skilled in the art that the present invention is not limited to what has been particularly shown and described hereinabove. Rather the scope of the present invention is defined only by the claims which follow:

We claim:

1. A configurable battery backed, output buffer comprises:
    output means, powered by a battery power supply, for producing a predefined output signal during operation with a battery power supply and for producing a signal in the tri-state during operation with a main power supply; and
    configuration means for activating or deactivating said output means in accordance with a predetermined configuration signal.

2. An output buffer according to claim 1 and wherein said configuration means comprises:
    a p-channel transistor which is connected between said battery power supply and said output means and which is activated by said predetermined configuration signal; and
    an n-channel transistor which is connected between said output means and a ground source and which is activated by a complement of said predetermined configuration signal.

3. An output buffer according to claim 2 and wherein said p-channel transistor has an n-well which is powered by a switchable power supply providing a main power supply voltage level when said main power supply is active and a battery supply voltage level when said battery supply voltage is active.

4. An output buffer according to claim 1 and also comprising:
    a second p-channel transistor which is connected between said first p-channel transistor and said output means and which is controlled by a battery off signal; and
    a second n-channel transistor which is connected between said output means and said first n-channel transistor and which is controlled by a complement of said battery off signal,
    wherein, when said battery off signal is high, both of said second p-channel and second n-channel transistors are deactivated.

5. An output buffer according to claim 4 and wherein said second p-channel transistor has an n-well which is powered by a switchable power supply providing a main power supply voltage level when said main power supply is active and a battery supply voltage level when said battery supply voltage is active.

6. An output buffer according to claim 1 and also comprising a diode connected between said battery supply and said configuration means.

7. A battery switchable output buffer comprising:
    an output line;
    a pull-up branch for receiving data to be provided out and for pulling the voltage of said output line up if said data has a high voltage level;
    a pull-down branch for receiving data to be provided out and for pulling the voltage of said output line down if said data has a low voltage level; and
    battery operation means for forcing both of said branches to an off position during battery operation thereby to provide a signal in the tri-state on said output line.

8. A battery switchable output buffer comprising:
    an output line;
    a p-channel pull-up transistor connected on output to said output line;
    an n-channel pull-down transistor connected on input to said output line;
    a pull-up branch for receiving data to be provided out and for activating a gate of said pull-up transistor if said data has a high voltage level;
    a pull-down branch for receiving data to be provided out and for activating a gate of said pull-down transistor if said data has a low voltage level; and
    battery operation means controlled by a battery on signal for deactivating both of said branches during operation of a battery thereby to deactivate both of said transistors and to provide a signal in the tri-state on said output line.

9. A buffer according to claim 8 and wherein said battery operation means comprises:
    a pull-up branch deactivator; and
    a pull-down branch deactivator,
    wherein said pull-up branch deactivator comprises:
        a p-channel pass transistor whose output is connected to said gate of said p-channel pull-up transistor and which is controlled by a battery on signal;
        an n-channel pass transistor connected in parallel to said p-channel pass transistor and which is controlled by a complement of said battery on signal; and
        a second p-channel pull-up transistor whose output is also connected to said gate of said p-channel pull-up transistor and which is controlled by said complement of said battery on signal,
        wherein, when said battery on signal is high, said pass transistors are deactivated and said second p-channel pull-up transistor is activated to raise the voltage level of said gate of said first p-channel pull-up transistor thereby to deactivate said first p-channel pull-up transistor;
    wherein said pull-down branch has a pull-up portion and a pull-down portion and said pull-down branch deactivator comprises:
        a second p-channel pass transistor connected in series between a voltage source and said pull-up portion and which is controlled by said battery on signal; and
        a second n-channel pull-clown transistor whose input is connected to said gate of said first n-channel pull-down transistor and which is controlled by said battery on signal, wherein, when said battery on signal is high, said second p-channel pass transistor is deactivated and said second n-channel pull-down transistor is activated, thereby to lower the voltage level of said gate of said first n-channel pull-down transistor thereby to deactivate said first n-channel pull-down transistor.

10. An output buffer according to claim 9 and wherein all of said p-channel transistors have n-wells which are powered by a switchable power supply providing a main power supply voltage level when said main power supply is active and a battery supply voltage level when said battery supply voltage is active.

11. An output buffer according to claim 8 and wherein said p-channel transistor has an n-well which is powered by a switchable power supply providing a main power supply voltage level when said main power supply is active and a battery supply voltage level when said battery supply voltage is active.

* * * * *